US006858284B2

(12) United States Patent
Nun et al.

(10) Patent No.: US 6,858,284 B2
(45) Date of Patent: Feb. 22, 2005

(54) SURFACES RENDERED SELF-CLEANING BY HYDROPHOBIC STRUCTURES, AND PROCESS FOR THEIR PRODUCTION

(75) Inventors: Edwin Nun, Billerbeck (DE); Markus Oles, Hattingen (DE); Bernhard Schleich, Recklinghausen (DE)

(73) Assignee: Creavis Gesellschaft fuer Technologie und Innovation mbH, Marl (DE)

( * ) Notice: Subject to any disclaimer, the term of this patent is extended or adjusted under 35 U.S.C. 154(b) by 26 days.

(21) Appl. No.: 10/118,258

(22) Filed: Apr. 9, 2002

(65) Prior Publication Data

US 2002/0150724 A1 Oct. 17, 2002

(30) Foreign Application Priority Data

Apr. 12, 2001 (DE) ........................................ 101 18 352

(51) Int. Cl.$^{7}$ ............................ B32B 5/16; B05D 1/12; B05D 3/02

(52) U.S. Cl. ....................... 428/149; 428/144; 428/143; 428/145; 428/147; 428/148; 428/220; 428/323; 428/327; 428/328; 428/331; 428/332; 427/199; 427/180; 427/204; 427/203; 427/201; 977/DIG. 1

(58) Field of Search ................................ 428/143, 144, 428/145, 147, 148, 149, 220, 323, 327, 328, 331, 332; 427/199, 204, 180, 203, 201, DIG. 1

(56) References Cited

U.S. PATENT DOCUMENTS

| | | | | | |
|---|---|---|---|---|---|
| 3,354,022 | A | | 11/1967 | Dettre et al. | |
| 5,141,915 | A | * | 8/1992 | Roenigk et al. | 503/227 |
| 5,432,000 | A | * | 7/1995 | Young et al. | 428/372 |
| 5,520,956 | A | * | 5/1996 | Kieser et al. | 427/203 |
| 5,599,489 | A | | 2/1997 | Saiki et al. | |
| 6,683,126 | B2 | * | 1/2004 | Keller et al. | 524/492 |
| 2001/0037876 | A1 | * | 11/2001 | Oost et al. | 165/133 |
| 2002/0150723 | A1 | * | 10/2002 | Oles et al. | 428/143 |
| 2002/0150724 | A1 | * | 10/2002 | Nun et al. | 428/143 |
| 2002/0150725 | A1 | * | 10/2002 | Nun et al. | 428/143 |
| 2002/0150726 | A1 | * | 10/2002 | Nun et al. | 428/143 |
| 2004/0047997 | A1 | * | 3/2004 | Keller et al. | 427/402 |

FOREIGN PATENT DOCUMENTS

| | | |
|---|---|---|
| DE | 199 17 367 | 10/2000 |
| EP | 1 040 874 | 10/2000 |
| WO | WO 96/04123 | 2/1996 |
| WO | WO 00/39239 | 7/2000 |
| WO | WO 00/58410 | 10/2000 |
| WO | WO 00/71834 | 11/2000 |

OTHER PUBLICATIONS

Patent Abstracts of Japan, JP 11–171592, Jun. 29, 1999.
U.S. Appl. No. 09/241,077, filed Feb. 1, 1999, pending.
U.S. Appl. No. 09/537,393, filed Mar. 29, 2000, pending.
U.S. Appl. No. 09/692,428, filed Oct. 20, 2000, pending.
U.S. Appl. No. 10/013,488, filed Dec. 13, 2001, pending.

(List continued on next page.)

*Primary Examiner*—William P. Watkins, III
(74) *Attorney, Agent, or Firm*—Oblon, Spivak, McClelland, Maier & Neustadt, P.C.

(57) ABSTRACT

A self-cleaning surface which has an artificial, at least partially hydrophobic, surface structure containing elevations and depressions, which comprises an at least partially hydrophobic surface formed from structure-forming particles of hydrophobic fumed silica having elevations and depressions ranging in dimensions of 1 to 1000 nm and the particles themselves having an average size of less than 50 μm adhered to the surface by way of a viscous, curable carrier material selected from the group consisting of polyurethane, polyurethane acrylates, silicone acrylates and singly and/or multiply unsaturated (meth)acrylates applied to the surface, which is sufficient to bond the structure forming particles without substantial wetting of the particles by the carrier material while retaining the fissured structure of elevations and depressions of the structure-forming particles in the nanometer range.

13 Claims, 2 Drawing Sheets

OTHER PUBLICATIONS

U.S. Appl. No. 10/214,202, filed Aug. 8, 2002, pending.
U.S. Appl. No. 10/118,257, filed Apr. 9, 2002, pending.
U.S. Appl. No. 10/120,365, filed Apr. 12, 2002, pending.
U.S. Appl. No. 10/120,366, filed Apr. 12, 2002, pending.
U.S. Appl. No. 09/926,401, filed Mar. 4, 2000, pending.
U.S. Appl. No. 09/926,504, filed Mar. 30, 2000, pending.
U.S. Appl. No. 10/069,562, filed Jul. 17, 2000, pending.
U.S. Appl. No. 10/111,407, filed Oct. 31, 2000, pending.
U.S. Appl. No. 10/137,445, filed May 3, 2002, pending.
U.S. Appl. No. 10/035,206, filed Jan. 4, 2002, pending.
U.S. Appl. No. 10/028,365, filed Dec. 28, 2001, pending.
U.S. Appl. No. 10/118,258, filed Apr. 9, 2002, pending.
U.S. Appl. No. 10/118,258, filed Apr 9, 2002, Nun et al.
U.S. Appl. No. 10/293,302, filed Nov. 14, 2002, Nun et al.
U.S. Appl. No. 10/309,297, filed Dec. 4, 2002, Nun et al.

* cited by examiner

SURFACES RENDERED SELF-CLEANING BY HYDROPHOBIC STRUCTURES, AND PROCESS FOR THEIR PRODUCTION

BACKGROUND OF THE INVENTION

1. Field of the Invention

The present invention relates to self-cleaning surfaces, and to processes for their production.

2. Discussion of the Background

Objects with surfaces which are extremely difficult to wet have a number of commercially significant features. The feature of most commercial significance here is the self-cleaning action of low-wettability surfaces, since the cleaning of surfaces is time-consuming and expensive. Self-cleaning surfaces are therefore of very great commercial interest. The mechanisms of adhesion are generally the result of surface-energy-related parameters relating to the two surfaces which are in contact. These systems generally attempt to reduce their free surface energy. If the free surface energies between two components are intrinsically very low, it can generally be assumed that there will be weak adhesion between these two components. The important factor here is the relative reduction in free surface energy. In pairings where one surface energy is high and one surface energy is low the crucial factor is very often the opportunity for interactive effects, for example, when water is applied to a hydrophobic surface it is impossible to bring about any noticeable reduction in surface energy. This is evident in that the wetting is poor. The water applied forms droplets with a very high contact angle. Perfluorinated hydrocarbons, e.g. polytetrafluoroethylene, have very low surface energy. There are hardly any components which adhere to surfaces of this type, and components deposited on surfaces of this type are in turn very easy to remove.

The use of hydrophobic materials, such as perfluorinated polymers, for producing hydrophobic surfaces is known. A further development of these surfaces consists in structuring the surfaces in the μm to nm range. U.S. Pat. No. 5,599,489 discloses a process in which a surface can be rendered particularly repellent by bombardment with particles of an appropriate size, followed by perfluorination. Another process is described by H. Saito et al. in "Service Coatings International" 4, 1997, pp. 168 et seq. Here, particles made from fluoropolymers are applied to metal surfaces, whereupon a marked reduction was observed in the wettability of the resultant surfaces with respect to water, with a considerable reduction in tendency toward icing.

U.S. Pat. No. 3,354,022 and WO 96/04123 describe other processes for reducing the wettability of objects by topological alterations in the surfaces. Here, artificial elevations or depressions with a height of from about 5 to 1000 μm and with a separation of from about 5 to 500 μm are applied to materials which are hydrophobic or are hydrophobicized after the structuring process. Surfaces of this type lead to rapid droplet formation, and as the droplets roll off they absorb dirt particles and thus clean the surface.

This principle is borrowed from the natural world. Small contact surfaces reduce Van der Waals interaction, which is responsible for adhesion to flat surfaces with low surface energy. For example, the leaves of the lotus plant have elevations made from a wax, and these elevations lower the contact area with water. WO 00/58410 describes these structures and claims the formation of the same by spray-application of hydrophobic alcohols, such as 10-nonokosanol, or of alkanediols, such as 5,10-nonokosanediol. A disadvantage here is that the self-cleaning surfaces lack stability, since the structure is removed by detergents.

Another method of producing easy-clean surfaces has been described in DE 199 17 367 A1. However, coatings based on fluorine-containing condensates are not self-cleaning. Although there is a reduction in the area of contact between water and the surface, this is insufficient.

EP 1 040 874 A2 describes the embossing of microstructures and claims the use of structures of this type in analysis (microfluidics). A disadvantage of these structures is their unsatisfactory mechanical stability.

JP 11171592 describes a water-repellent product and its production, the dirt-repellent surface being produced by applying a film to the surface to be treated, the film having fine particles made from metal oxide and having the hydrolysate of a metal alkoxide or of a metal chelate. To harden this film the substrate to which the film has been applied has to be sintered at temperatures above 400° C. The process is therefore suitable only for substrates which are stable even at temperatures above 400° C.

SUMMARY OF THE INVENTION

It is an object of the present invention to provide surfaces which are particularly effective in self-cleaning and which have structures in the nanometer range, i.e., from about 1 to about 1000 nm, and also to provide a simple process for producing self-cleaning surfaces of this type.

Another object of the present invention is to provide a process for producing self-cleaning surfaces, where the chemical or physical stresses to which the coated material are exposed are only small.

The present invention therefore provides a self-cleaning surface which has an artificial, i.e., synthetic, at least partially hydrophobic, surface structure of elevations and depressions, where the elevations and depressions are formed by particles secured by means of a carrier on the surface, wherein the particles have a fissured structure with elevations and/or depressions in the nanometer range.

The present invention also provides a process for producing self-cleaning surfaces by producing a suitable, at least partially hydrophobic, surface structure by securing particles by means of a carrier on a surface, which comprises using particles which have fissured structures with elevations and/or depressions in the nanometer range.

DETAILED DESCRIPTION OF THE INVENTION

The process of the invention gives access to self-cleaning surfaces which have particles with a fissured structure. The use of particles which have a fissured structure gives simple access to surfaces with structuring extending into the nanometer range. For this structure in the nanometer range to be retained, it is necessary for the particles not to have been wetted by the carrier by which they have been secured to the surface, since otherwise the structure in the nanometer range would be lost.

Another advantage of the process of the invention is that surfaces sensitive to scratching are not damaged by particles present in the carrier when the particles are applied, since when surface coatings are used with subsequent application of the particles to the carrier, the surface sensitive to scratching has prior protection by the carrier.

Substances used for securing particles to a surface are hereinafter termed carriers.

The self-cleaning surface of the invention, which has an artificial, and at least partially hydrophobic, surface structure made from elevations and depressions, the elevations and depressions being formed by particles secured to the surface by means of a carrier, features particles which have a fissured structure with elevations and/or depressions in the nanometer range. The elevations and/or depressions may span any and all sub-ranges within the broad range of from about 1 to about 1000 nm. The elevations preferably have an average height of from 20 to 500 nm, particularly preferably from 50 to 200 nm. The separation of the elevations and, respectively, depressions on the particles is preferably less than 500 nm, very particularly preferably less than 200 nm.

The fissured structures with elevations and/or depressions in the nanometer range may be formed for example by cavities, pores, grooves, peaks, and/or protrusions. The particles themselves have an average size of less than 50 $\mu$m, preferably less than 30 $\mu$m, and very particularly preferably less than 20 $\mu$m.

Figure 3:
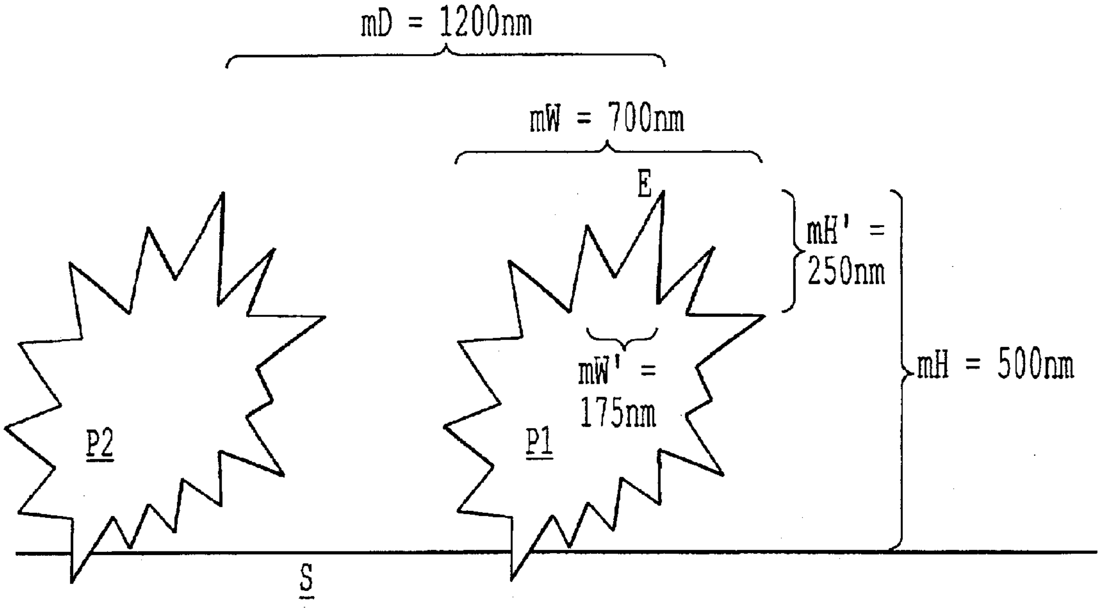
FIG. 3 is a two-dimensional schematic drawing of particles on a surface according to the present invention.

The fissured structures can also be characterized as craggy structures. An example of such a structure is demonstrated in FIG. 3. FIG. 3 is a two dimensional schematic figure of a structured surface S having fixed thereupon two particles P1 and P2, their approximate centers being spaced apart at a distance mD, such as 1200 nm. The particle P1 has an average size determined by a width mW, such as 700 nm and a height mH, such as 500 nm. Each of the particles has on its surface elevations E in the nanometer range, with a height mH', such as 250 nm, and a distance between elevations mW', such as 175 nm. The height and distance between depressions is analogous. Of course, a structure according to the invention will have many particles, of differing dimensions and shapes. Also, as seen from FIG. 3, there can be two kinds of elevations, the first ones prepared through the particles themselves and the second ones provided by the structured surfaces of the particles, if structured particles are used.

The particles preferably have a BET surface area of from 50 to 600 square meters per gram. The particles very particularly preferably have a BET surface area of from 50 to 200 $m^2/g$.

The particles used in forming the structure may be of a wide variety of compounds from many branches of chemistry. The particles preferably have at least one material selected from silicates, doped silicates, minerals, metal oxides, silicas, polymers, and silica-coated metal powders. The particles very particularly preferably comprise fumed silicas or precipitated silicas, in particular Aerosils, $Al_2O_3$, $SiO_2$, $TiO_2$, $ZrO_2$, zinc powder coated with Aerosil R974, preferably with a particle size of 1 $\mu$m, or pulverulent polymers, e.g. cryogenically milled or spray-dried polytetrafluoroethylene (PTFE) or perfluorinated copolymers or copolymers with tetrafluoroethylene.

Besides the fissured structures, the particles also preferably have hydrophobic properties in order to generate the self-cleaning surfaces. The particles themselves may be hydrophobic, e.g. particles comprising PTFE, or the particles used may have been hydrophobicized. The hydrophobicization of the particles may take place in a manner known to the skilled worker. Examples of typical hydrophobicized particles are commercially available particles, for example fine powders, such as Aerosil R8200 (Degussa AG).

The silicas whose use is preferred preferably have a dibutyl phthalate adsorption to DIN 53 601 of from 100 to 350 ml/100 g, the values preferably being from 250 to 350 ml/100 g.

A carrier is used to secure the particles to the surface. The self-cleaning surface can be generated by applying the particles in a densely packed layer to the surface.

In one preferred embodiment of the self-cleaning surface of the invention, the carrier is a surface coating cured by means of thermal energy and/or the energy in light, or a two-component surface coating system, or some other reactive surface coating system, the curing preferably taking place by polymerization or crosslinking. The cured surface coating particularly preferably comprises polymers and/or copolymers made from singly and/or multiply unsaturated acrylates and/or methacrylates. The mixing ratios may be varied within wide boundaries. It is also possible for the cured surface coating to comprise compounds having functional groups, e.g. hydroxyl groups, epoxy groups, amine groups, or fluorine-containing compounds, e.g. perfluorinated acrylic esters. This is advantageous particularly if the compatibilities of surface coating and hydrophobic particles are balanced with respect to one another, as is the case, for example, using N-[2-(acryloyloxy)ethyl]-N-ethylperfluorooctane-1-sulfonamide with Aerosil R8200. The surface coatings which may be used are not only surface coatings based on acrylic resin but also surface coatings based on polyurethane, and also surface coatings which comprise polyurethane acrylates or silicone acrylates.

The self-cleaning surfaces of the invention have a roll-off angle of less than 20°, particularly preferably less than 10°, the definition of the roll-off angle being that a water droplet rolls off when applied from a height of 1 cm to a flat surface resting on an inclined plane. The advancing angle and the receiving angle are above 140°, preferably above 150°, and have less than 15° of hysteresis, preferably less than 10°. The fact that the surfaces of the invention have an advance angle and receding angle of at least 140°, preferably more than 150°, means that it is possible to obtain particularly good self-cleaning surfaces.

Depending on the surface coating system used, and on the size and material of the particles used, it is possible to obtain semitransparent self-cleaning surfaces. The surfaces of the invention may particularly be contact-transparent, i.e. when a surface of the invention is produced on an object on which there is writing, this writing remains legible if its size is adequate.

The self-cleaning surfaces of the invention are preferably produced by the process of the invention intended for producing these surfaces. The process of the invention for producing self-cleaning surfaces by producing a suitable, at least partially hydrophobic, surface structure by securing particles by means of a carrier on a surface, uses particles which have fissured structures with elevations and/or depressions in the nanometer range.

Use is preferably made of particles which comprise at least one material selected from silicates, doped silicates, minerals, metal oxides, silicas and polymers. The particles particularly preferably comprise fumed silicates or silicas, in particular Aerosils, minerals, such as magadiite, $Al_2O_3$, $SiO_2$, $TiO_2$, $ZrO_2$, zinc powder coated with Aerosil R974, or pulverulent polymers, e.g. cryogenically milled or spray-dried polytetrafluoroethylene (PTFE).

Particular preference is given to the use of particles with a BET surface area of from 50 to 600 $m^2/g$. Very particular preference is given to the use of particles which have a BET surface area of from 50 to 200 $m^2/g$.

The particles for generating the self-cleaning surfaces preferably have not only fissured structures but also hydrophobic properties. The particles may themselves be hydrophobic, e.g. particles comprising PTFE, or the particles used may have been hydrophobicized. The hydrophobicization of the particles may take place in a manner known to the skilled worker. Examples of typical hydrophobicized particles are commercially available particles, for example fine powders, such as Aerosil R974, or Aerosil R8200 (Degussa AG).

The process of the invention preferably has the following steps a) applying a curable substance as carrier to a surface, b) applying, to the carrier, particles which have fissured structures, and c) curing the carrier to secure the particles.

The curable substance may be applied for example using a spray, a doctor, a brush or a jet. The curable substance is preferably applied at a thickness of from 1 to 100 μm, preferably at a thickness of from 5 to 50 μm. Depending on the viscosity of the curable substance, it may be advantageous to allow the substance to undergo some extent of curing or of drying prior to applying the particles. The viscosity of the curable substance is preferably selected so that the particles applied can sink into the curable substance at least partially, but so as to prevent flow of the curable substance and, respectively, of the particles applied thereto when the surface is placed vertically.

The particles may be applied by commonly used processes, such as spray application or powder application. In particular, the particles may be applied by spray application using an electrostatic spray gun. Once the particles have been applied, excess particles, i.e. particles not adhering to the curable substance, may be removed from the surface by shaking, or by being brushed off or blown off. These particles may be collected and reused.

The curable substance used as carrier may be a surface coating which at least comprises mixtures made from singly and/or multiply unsaturated acrylates and/or methacrylates. The mixing ratios may be varied within wide limits. It is particularly preferable to use a surface coating curable by means of thermal or chemical energy, and/or the energy in light.

If the particles used have hydrophobic properties, the curable substance selected is a surface coating, or a surface coating system, which has hydrophobic properties. On the other hand, if the particles used have hydrophilic properties, the curable substance selected will be a surface coating having hydrophilic properties.

It can be advantageous for the mixtures used as surface coating to comprise compounds having functional groups, e.g. hydroxyl groups, epoxy groups, amine groups, or fluorine-containing compounds, e.g. perfluorinated acrylic esters. This is advantageous particularly if the compatibilities of surface coating and hydrophobic particles (in relation to hydrophobic properties) are balanced with respect to one another, as is the case, for example, using N-[2-(acryloyloxy)ethyl]-N-ethylperfluorooctane-1-sulfonamide with Aerosil VPR411. The curable substances which may be used are not only surface coatings based on acrylic resin but also surface coatings based on polyurethane, and surface coatings which comprise polyurethane acrylates or silicone acrylates. The curable substances used may also be two-component surface-coating systems or other reactive surface coating systems.

The particles are secured to the carrier by curing of the carrier, preferably, depending on the surface coating system used, by thermal and/or chemical energy, and/or the energy in light. The curing of the carrier, brought about by chemical or thermal energy, and/or the energy present in light, may take place for example by polymerization or crosslinking of the constituents of the surface coatings or surface coating systems. The curing of the carrier, particularly preferably takes place by way of the energy in light, and the polymerization of the carrier very particularly preferably takes place by way of the light from a medium-pressure Hg lamp, in the UV region. The curing of the carrier preferably takes place in an inert gas atmosphere, very particularly preferably in a nitrogen atmosphere.

Depending on the thickness of the curable substance applied and the diameter of the particles used, it may be necessary to limit the time which expires between applying the particles and curing the curable substance, in order to avoid complete immersion of the particles in the curable substance. The curable substance is preferably cured within a period of from 0.1 to 10 min, preferably within a period of from 1 to 5 min, after application of the particles.

In carrying out the process of the invention it can be advantageous to use particles which have hydrophobic properties and/or which have hydrophobic properties by way of treatment with at least one compound from the group consisting of the alkylsilanes, alkyldisilazanes, or perfluoroalkylsilanes. The hydrophobicization of particles is known, as described, for example, in the Degussa AG series of publications Pigmente [Pigments], number 18.

It can also be advantageous for the particles to be given hydrophobic properties after securing to the carrier. One way in which this may take place is that the particles of the treated surface are given hydrophobic properties by way of treatment with at least one compound from the group consisting of the alkylsilanes and the perfluoroalkylsilanes, e.g. those which can be purchased from Sivento GmbH. The method of treatment is preferably that the surface which comprises particles and which is to be hydrophobicized is dipped into a solution which comprises a hydrophobicizing reagent, e.g. alkylsilanes, excess hydrophobicizing reagent is allowed to drip off, and the surface is annealed at the highest possible temperature. The maximum temperature which may be used is limited by the softening point of carrier or substrate.

The process of the invention gives excellent results when used for producing self-cleaning surfaces on planar or nonplanar objects, in particular on nonplanar objects. This is possible to only a limited extent with the conventional processes. In particular, nonplanar objects, e.g. sculptures, are inaccessible or only accessible to a limited extent when using processes which apply prefabricated films to a surface or processes intended to produce a structure by embossing. However, the process of the invention may, of course, also be used to produce self-cleaning surfaces on objects with planar surfaces, e.g. greenhouses or public conveyances. The use of the process of the invention for producing self-cleaning surfaces on greenhouses has particular advantages, since the process can also produce self-cleaning surfaces on transparent materials, for example, such as glass or Plexiglas®, and the self-cleaning surface can be made transparent at least to the extent that the amount of sunlight which can penetrate the transparent surface equipped with a self-cleaning surface is sufficient for the growth of the plants in the greenhouse. Greenhouses which have a surface of the invention can be operated with intervals between cleaning which are longer than for conventional greenhouses, which have to be cleaned regularly to remove leaves, dust, lime, and biological material, e.g. algae.

In addition, the process of the invention can be used for producing self-cleaning surfaces on non-rigid surfaces of objects, e.g. umbrellas or other surfaces required to be flexible. The process of the invention may very particularly preferably be used for producing self-cleaning surfaces on flexible or non-flexible partitions in the sanitary sector, examples of partitions of this type are partitions dividing public toilets, partitions of shower cubicles, of swimming pools, or of saunas, and also shower curtains (flexible partition).

The examples below are intended to provide further description of the surfaces of the invention and the process for producing the surfaces, without limiting the invention to these embodiments.

EXAMPLES

Example 1

20% by weight of methyl methacrylate, 20% by weight of pentaerythritol tetraacrylate, and 60% by weight of hexanediol dimethacrylate were mixed together. Based on this mixture, 14% by weight of Plex 4092 F, an acrylic copolymer from Röhm GmbH and 2% by weight of Darokur 1173 UV curing agent were added, and the mixture stirred for at least 60 min. This mixture was applied as carrier at a thickness of 50 μm to a PMMA sheet of thickness 2 mm. The layer was dried partially, for 5 min. The particles then applied by means of an electrostatic spray gun were hydrophobicized Aerosil VPR 411 fumed silica (Degussa AG). After 3 min, the carrier was cured at a wavelength of 308 nm under nitrogen. Once the carrier had been cured, excess Aerosil VPR 411 was brushed off. The surface was first characterized visually and recorded as +++, meaning that there is almost complete formation of water droplets. The roll-off angle was 2.4°. The advance angle and receding angle were each measured and found to be above 150°. The associated hysteresis is below 10°.

Example 2

Figure 1:
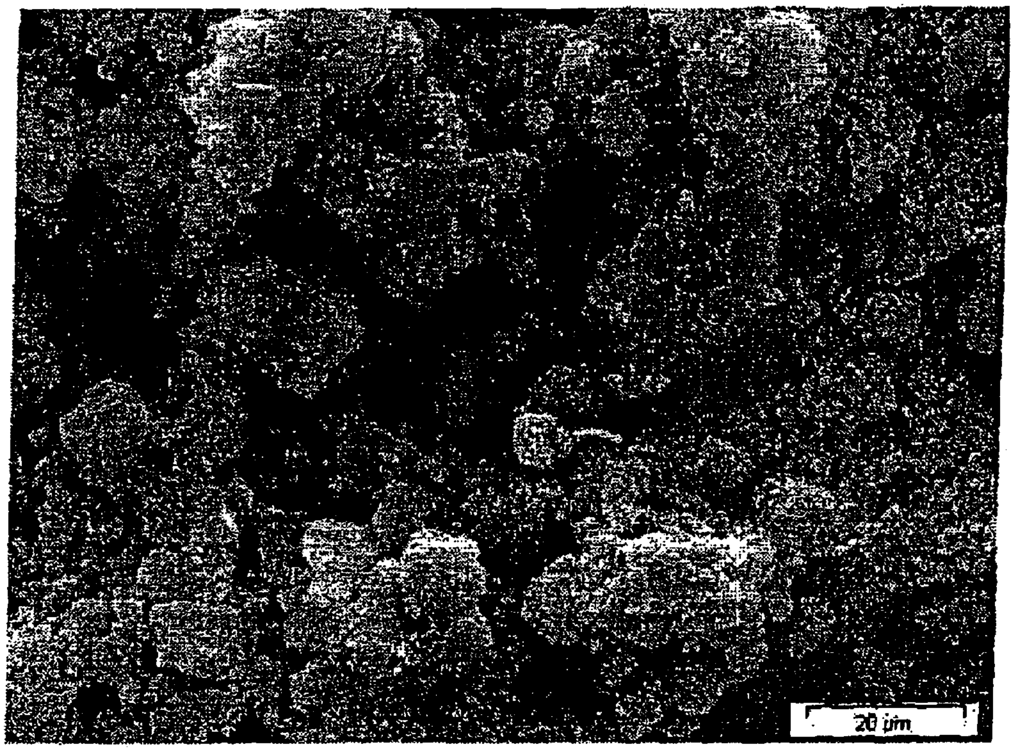
FIGS. 1 and 2 reproduce scanning electron micrographs (SEMs) of particles used to form structures.

The experiment of Example 1 was repeated, particles made from aluminum oxide C (Degussa AG), an aluminum oxide with a BET surface area of 100 $m^2/g$, being applied by electrostatic spraying. Once the carrier had been cured, as in Example 1, and excess particles had been brushed off, the cured, brushed-off sheet was dipped into a formulation of tridecafluorooctyltriethoxysilane in ethanol (Dynasilan 8262, Sivento GmbH), for hydrophobicization. Once excess Dynasilan 8262 had dripped off, the sheet was annealed at a temperature of 80° C. The surface was classified as ++, i.e. water droplet development is not ideal, and the roll-off angle is below 20°. FIG. 1 shows an SEM of aluminum oxide C.

Example 3

Figure 2:
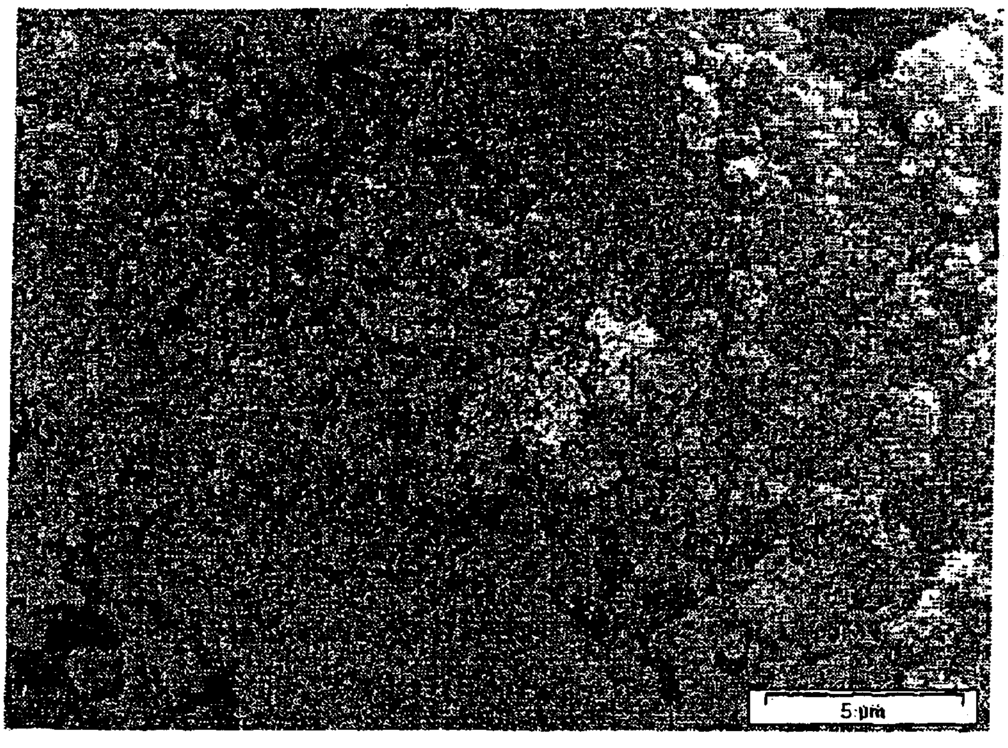

Sipernat FK 350 silica from Degussa AG is sprinkled onto the sheet from Example 1, treated with the carrier. After 5 min of penetration time, the treated sheet is cured under nitrogen in UV light at 308 nm. Once again, excess particles are brushed off, and the sheet is then in turn dipped in Dynasilan 8262, and then annealed at 80° C. The surface is classified as +++. FIG. 2 shows an SEM of the surface of particles of Sipernat FK 350 silica on a carrier.

Example 4

The experiment of Example 1 is repeated, but Aerosil R 8200 (Degussa AG), which has a BET surface area of 200±25 $m^2/g$, is used instead of Aerosil VPR 411. The assessment of the surface is +++. The roll-off angle is determined as 1.3°. Advance angle and receding angle were also measured and each was greater than 150°. The associated hysteresis is below 10°.

Example 5

The surface coating from Example 1, after mixing with the UV curing agent, was additionally provided with 10% by weight (based on the total weight of the surface coating mixture) of 2-(N-ethylperfluorooctanesulfonamido)ethyl acrylate. This mixture, too, was again stirred for at least 60 min, and applied as carrier at a thickness of 50 μm to a PMMA sheet of thickness 2 mm. The layer was dried partially, for 5 min. The particles then applied by means of an electrostatic spray gun were hydrophobicized Aerosil VPR 411 fumed silica (Degussa AG). After 3 min, the carrier was cured at a wavelength of 308 mm under nitrogen. Once the carrier had cured, excess Aerosil VPR 411 was brushed off. The surface was first characterized visually and recorded as +++, meaning that there is almost complete formation of water droplets. The roll-off angle was 0.5°. Advance angle and receding angle were each measured and were greater than 150°. The associated hysteresis is below 10°.

Comparative Example 1

A suspension of 10% by weight of spray-dried fumed silica, Aeroperl 90/30, Degussa AG, a silica with a BET surface area of 90 $m^2/g$, in ethanol, was doctor-applied to the carrier of Example 1, the carrier having been applied at a thickness of 200 μm and dried partially. After curing in UV light and treatment with Dynasilan 8262 hydrophobicizing agent, the surface is assessed as only +, i.e. droplet formation is poor and the droplet adheres to the surface until the angle of inclination is high.

The poor cleaning effect is attributable to filling-in of the fissured structures. This probably takes place by way of solution of monomers of the as yet uncured lacquer system in ethanol. Prior to curing, the ethanol evaporates and the monomers remain behind in the fissured structures, where they likewise cure during the curing procedure, the result being filling-in of the fissured structures. This markedly impairs the self-cleaning effect.

The disclosure of German priority patent application 10118352.6, filed Apr. 12, 2001, is hereby incorporated by reference.

What is claimed is:

1. A self-cleaning surface which has an artificial, at least partially hydrophobic, surface structure containing elevations and depressions, which comprises:

an at least partially hydrophobic surface formed from structure-forming particles of hydrophobic fumed silica having elevations and depressions ranging in dimensions of 1 to 1000 nm and the particles themselves having an average size of less than 50 μm adhered to the surface by way of a viscous, curable carrier material selected from the group consisting of polyurethane, polyurethane acrylates, silicone acrylates and singly and/or multiply unsaturated (meth)acrylates applied to the surface, which is sufficient to bond the structure forming particles without substantial wetting of the particles by the carrier material while retaining the fissured structure of elevations and depressions of the structure-forming particles in the nanometer range.

2. The self-cleaning surface as claimed in claim 1, wherein the carrier is a surface coating that is cured by thermal or chemical energy or by light energy.

3. The self-cleaning surface as claimed in claim 1, wherein the particles have an average size of less than 30 μm.

4. A process for producing self-cleaning surfaces, which comprises:

applying a viscous, curable carrier material selected from the group consisting of polyurethane, polyurethane acrylates, silicone acrylates and singly and/or multiply unsaturated (meth)acrylates to a surface, and then applying structure-forming particles of hydrophobic fumed silica to the surface coated with carrier material, the structure-forming particles having elevations and depressions ranging in dimensions of 1 to 1000 nm and the particles themselves having an average size of less than 50 μm, whereby the particles are bonded to the surface without substantial wetting of the particles by the carrier material while retaining the fissured structure of elevations and depressions of the structure-forming particles in the nanometer range.

5. The process as claimed in claim 4, which comprises curing the coated carrier material by thermal or chemical energy or by light energy.

6. The process as claimed in claim 4, wherein the curable coating material is a carrier material selected from the group consisting of polyurethane, polyurethane acrylates, silicone acrylates and singly and/or multiply unsaturated (meth) acrylates.

7. The process as claimed in claim 4, wherein the curable coating material produces a surface that has hydrophobic properties when the particles have hydrophobic properties, and the curable coating material produces a surface coating which has hydrophilic properties when the particles have hydrophilic properties.

8. The process as claimed in claim 4, wherein the hydrophobic properties are imparted to the particles by treatment of the structure-forming particles with at least one compound selected from the group consisting of alkylsilanes, perfluoroalkylsilanes and alkylsilazanes.

9. The process as claimed in claim 4, wherein the hydrophobic properties are imparted to the particles after securing of the particles to the surface by the coated carrier material.

10. The process as claimed in claim 9, wherein the particles comprise particles which have hydrophobic properties as a result of treatment of the particles with at least one compound selected from the group consisting of alkylsilanes, perfluoroalkylsilanes and alkylsilazanes.

11. The process as claimed in claim 4, wherein the self-cleaning surfaces comprise non-rigid surfaces of objects.

12. The process as claimed in claim 4, wherein the self-cleaning surfaces are on flexible or inflexible sanitary partitions.

13. The self-cleaning surface as claimed in claim 1, wherein the self-cleaning surface is a component of a structure in a greenhouse or public conveyance that is in contact with the atmosphere.

* * * * *